United States Patent Office 3,627,507
Patented Dec. 14, 1971

3,627,507
PLANT GROWTH REGULANT CARBAMOYLPHOSPHONATES
William P. Langsdorf, Jr., Wilmington, Del., assignor to E. I. du Pont de Nemours and Company, Wilmington, Del.
No Drawing. Filed May 24, 1968, Ser. No. 731,732
Int. Cl. A01n 5/00
U.S. Cl. 71—76
23 Claims

ABSTRACT OF THE DISCLOSURE

This disclosure teaches a method for employing novel carbamoylphosphonates such as ammonium ethyl carbamoylphosphonate and ammonium allyl carbamoylphosphonate to regulate the growth rate of plants.

BACKGROUND OF THE INVENTION

This invention relates to the discovery that a selected group of novel carbamoylphosphonates can be used to regulate the growth rate of plants. More particularly, the compounds of this invention are useful for controlling the growth of woody vegetation.

Related compounds such as the dialkyl carbamoylphosphonates are disclosed in U.S. Pat. 3,294,522 as plant desiccants, defoliants and herbicides.

SUMMARY OF THE INVENTION

In summary, this invention relates to a novel group of carbamoylphosphonates, the method of using the carbamoylphosphonates to regulate the growth rate of plants and formulations containing carbamoylphosphonates which are useful to regulate the growth rate of plants.

More particularly, the carbamoylphosphonates of this invention are represented by the formula:

(1)

$$R_1-O-\overset{\overset{O}{\uparrow}}{\underset{\underset{O-M^+}{|}}{P}}-\overset{\overset{O}{\|}}{C}-N\overset{R_2}{\underset{R_3}{\diagdown}}$$

where $R_1$ is alkyl of one through four carbons, alkenyl of three through four carbons, alkynyl of three through four carbons, phenyl or benzyl; $R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $-(CH_2)_2-O-(CH_2)_2-$ or $$-(CH_2)_n-$$

where $n$ is 4, 5 or 6; and

M is hydrogen, sodium, lithium, potassium, calcium, magnesium, barium or $$\overset{R_4}{\underset{R_5}{\diagdown}}\overset{}{\underset{}{\overset{+}{N}}}\overset{R_6}{\underset{R_7}{\diagup}}$$

where $R_4$, $R_5$ and $R_6$ can be the same or different and each can be hydrogen or alkyl of one through four carbons; and $R_7$ is hydrogen, alkyl of one through twelve carbons or benzyl.

Preferred compounds of this invention include those compounds of Formula 1 where $R_1$ is alkyl of one through four carbons or alkenyl of three through four carbons; $R_2$ and $R_3$ are each hydrogen; and M is ammonium or alkali metal such as sodium, lithium or potassium.

The most preferred compounds of this invention are ammonium allyl carbamoylphosphonate and ammonium ethyl carbamoylphosphonate.

Another aspect of this invention relates to the method for modifying the growth rate of plants which comprises applying an effective amount of a compound of Formula (1) to a plant to effect modification of the growth rate of said plant. Specifically, the method of this invention results in retarding the growth rate of the treated plants.

Yet another aspect of this invention relates to formulations of compounds of Formula (1) with suitable agricultural adjuvants and modifiers.

DESCRIPTION OF THE INVENTION

This invention is founded on the discovery that the compounds of Formula (1) are useful for modifying the growth rate of plants. In this regard, it has been noted that the compounds of this invention, as represented by Formula (1), are particularly useful to retard the growth rate of plants without killing them. The compounds of this invention can, therefore, be applied in areas such as power line rights-of-way where low growing and slow growing vegetation is especially desirable.

Preparation

The ammonium carbamoylphosphonate salts of this invention are readily prepared by the interaction of the diesters of carboalkoxyphosphonic acids with aqueous solutions of ammonia, primary amines or secondary amines.

This reaction can be considered to occur in two steps as is illustrated by the following equations.

$$(2)\quad R_1O-\overset{\overset{O}{\uparrow}}{\underset{\underset{OR}{|}}{P}}-\overset{\overset{O}{\|}}{C}-OR_4 + R_2R_3NH \xrightarrow{H_2O} R_1O-\overset{\overset{O}{\uparrow}}{\underset{\underset{OR}{|}}{P}}-\overset{\overset{O}{\|}}{C}-N\overset{R_2}{\underset{R_3}{\diagdown}} + R_4CH$$

$$(3)\quad R_1O-\overset{\overset{O}{\uparrow}}{\underset{\underset{OR}{|}}{P}}-\overset{\overset{O}{\|}}{C}-N\overset{R_2}{\underset{R_3}{\diagdown}} + H_2O \xrightarrow{R_2R_3NH} R_1O-\overset{\overset{O}{\uparrow}}{\underset{\underset{O-R_2R_3\overset{+}{N}H_2}{|}}{P}}-N\overset{R_2}{\underset{R_3}{\diagdown}} + ROH$$

In Equations (2) and (3) R is alkyl of one through four carbons, alkenyl of three through four carbons, phenyl or benzyl; $R_1$ is alkyl of one through four carbons, alkenyl of three through four carbons, phenyl or benzyl; $R_2$ and $R_3$ can be the same or different and each can be hydrogen, alkyl of one through four carbons, alkenyl of three through four carbons; alkynyl of three through four carbons or $R_2$ and $R_3$ can be taken together to form a ring system wherein $R_2$ and $R_3$ are collectively $$-(CH_2)_2-O-(CH_2)_2-$$

or $(CH_2)_n$ where n is 4, 5 or 6; and $R_4$ is alkyl of one through four carbons, preferably methyl or ethyl.

The synthesis method, exemplified by Equations 2 and 3 involves concurrent or consecutive aminolysis and hydrolysis of the starting carboalkoxyphosphonic acid diester by interaction with water and the amine reactant.

While Equations 2 and 3 represent the route predominantly taken by the reaction when combined in one operation, some hydrolysis may occur during or before aminolysis. However, the postulated reaction sequence as represented by Equations 2 and 3 favoring formation of the carbamoylphosphonate intermediate is proved experimentally, as it is possible in some instances to isolate the carbamoylphosphonate intermediate shown as the product of Equation 2. It has, of course, also been experimentally demonstrated that the product of Equation 3 is in fact obtained.

The carbamoyloxyphosphonate diesters prepared as described above or by methods described in the chemical literature are readily hydrolized to the monoester salt compounds of this invention by addition to aqueous ammonium or amine solutions. This procedure may be used therefore to obtain a "mixed" product, comprising a salt of one amine and an amide of another. This will be discussed and exemplified below.

The diesters of carboalkoxyphosphonic acid and carbamoylphosphonic acid used for the synthesis of the compounds of this invention can be prepared by methods available in the literature, such as Reetz, et al., J.A.C.S. 77, 3813–16, 1955, using appropriate ester intermediates. Generally, the alkoxy group of the carboalkoxyphosphonate is limited for practical purposes to methyl and ethyl, since there appears to be no advantage to increasing the size of the alcohol moiety. However, higher alcohol derivatives are useful in some instances.

The following are illustrative of typical diesters of the carboalkoxyphosphonates:

Diethyl carbomethoxyphosphonate
Diallyl carbomethoxyphosphonate
Diisopropyl carboethoxyphosphonate
Dibutyl carbobutoxyphosphonate
Dimethallyl carboethoxyphosphonate The following are illustrative of typical carbamoylphosphonate esters:

Diethyl carbamoylphosphonate
Diallyl diallylcarbamoylphosphonate
Diallyl carbamoylphosphonate
Dipropyl methylcarbamoylphosphonate
Dimethyl allylcarbamoylphosphonate The following are illustrative of the amines which can be used for the amination and/or hydrolysis of the esters:

| Ammonia | Propylamine |
|---|---|
| Methylamine | Ethylamine |
| Dimethylamine | Morpholine |
| Allylamine | Piperidine |

More particularly, in the preferred procedure for preparing the ammonium monoalkyl carbamoylphosphonate salts of this invention, a diester of a carboalkyoxyphosphonic acid or carbamoyloxyphosphonic acid is added to a stirred aqueous solution of ammonia or other amine. Stirring is continued until a clear solution is obtained. The resultant salt can then be isolated by removal of the water through evaporation or by stripping under reduced pressure. In general, these salts are white crystalline solids which are stable to the normal atmosphere and water. Many of these salts can be recrystallized from one or a mixture of several lower alcohols. Not all of the products are crystals, however, as many are viscous liquids which either dissolve or disperse readily in water.

It is preferred that an excess of ammonia or amine be employed in this reaction to insure good yields and rapid reaction. A ratio of diester to amine of 1::2 and greater is employed. Preferably the ratio of diester to amine of between 1::5 and 1::10 is employed.

The excess amine insures that amidation of the carboxylic ester rather than hydrolysis is the predominant reaction. There is but slight hydrolysis of the last phosphonic ester group in the product, even in the presence of the excess amine due to the mild reaction conditions employed in this process.

It is also preferred that a concentration of ammonia or amine of from 25% to 50% be employed, although the reaction can be operated at higher or lower concentrations.

When the amine reactant is not highly soluble in water, another solvent, such as methanol or ethanol can be added to the aqueous system to solubilize the amine reactant and thereby increase its reactivity.

This process can conveniently be carried out at about room temperature, although higher temperatures can also be employed if it is desired to speed up the rate of reaction. This process is only moderately exothermic, and therefore requires little control other than regulation of the diester addition rate to maintain the desired temperature. In some cases, slight cooling of the reaction mixture is also required.

A highly satisfactory procedure as regards this aspect is to slowly add the diester to a stirring aqueous solution of the amine which is cooled and maintained at about 15° C. When addition of the diester is complete, the temperature of the mixture is allowed to come to room temperature or slightly above. Generally, the reaction is complete in a few minutes to several hours depending on the reactants and conditions used.

The ammonium salts prepared as described above can be converted to salts of other bases or of alkaline and alkaline earth metals by interchanging the ammonium salt with appropriate bases or salts.

Another method is to convert the ammonium salt to the free acid, and then neutralize the free acid with a free base or appropriate salt.

The following illustrative examples are presented to further illustrate this invention. In the following examples, parts and percentages are by weight unless otherwise specified.

EXAMPLE 1

A solution of 48.5 parts 29% aqueous ammonium hydroxide is stirred and cooled with an external ice bath to 15° C. To the cooled solution 22 parts diallyl carbomethoxyphosphonate is slowly added over a ten-minute period. The mixture turns cloudy, but clears up after about 15 minutes. During this time, the mixture is allowed to warm spontaneously to about 30° C. and stirring is continued for two hours. The clear solution is transferred to a clear flask and stripped under reduced pressure (15 mm./4 g.) at a water-bath temperature of 70° C. The residue is a white crystalline solid which is recrystallized from absolute ethyl alcohol, giving as a white crystalline solid 12.3 parts ammonium monoallyl carbomethoxyphosphonate, M.P. 160–162.5° C. Nonaqueous titration either as an acid or a base gives a molecular weight of 182±1.

EXAMPLES 2–10

The procedure of Example 1 is repeated by substituting an equivalent amount of the indicated "Phosphonate Ester" for the diallyl carbomethoxyphosphonate of Example 1 to produce the indicated "Salt Product."

| Ex. | Phosphonate ester | Salt product |
|---|---|---|
| 2 | Diethyl carbomethoxyphosphonate. | Ammonium monoethyl carbamoylphosphonate. |
| 3 | Diethyl carbobutoxyphosphonate. | Do. |
| 4 | Dibutyl carboethoxyphosphonate. | Ammonium monobutyl carbamoylphosphonate. |
| 5 | Diallyl carboethoxyphosphonate. | Ammonium monoallyl carbamoylphosphonate. |
| 6 | Dimethallyl carbomethoxyphosphonate. | Ammonium monomethallyl carbamoylphosphonate. |
| 7 | Diisopropyl carboethoxyphosphonate. | Ammonium monoisopropyl carbamoylphosphonate. |
| 8 | Dimethyl carbomethoxyphosphonate. | Ammonium monomethyl carbamoylphosphonate. |
| 9 | Dipropyl carbopropoxyphosphonate. | Ammonium monopropyl carbamoylphosphonate. |
| 10 | Diisobutyl carbomethoxyphosphonate. | Ammonium monoisobutyl carbamoylphosphonate. |

EXAMPLE 11

To a stirring ice-chilled solution of 35 parts 40% methylamine in water is added slowly 8.4 parts of dimethyl carbomethoxyphosphonate. The mixture is warmed to 25° C. and allowed to stir for 3 hours. The clear solution on stripping under reduced pressure yields 9.6 parts methylammonium monomethyl methylcarbamoylphosphonate as a colorless oil. The product analyzes for the dihydrate.

EXAMPLES 12–20

The procedure of Example 11 is repeated substituting an equivalent amount of the indicated "Aqueous Amine" for the methylamine of Example 11 and an equivalent amount of the indicated "Phosphonate Ester" for the dimethylcarbomethoxyphosphonate of Example 11 to obtain the indicated "Salt Product." Most of the indicated "Salt Products" are isolated as liquids or low melting solids.

reacted ammonium hydroxide and water are removed from the mixture under reduced pressure, leaving as a solid residue ammonium monobenzyl carbamoylphosphonate.

| Ex. | Aqueous amine | Phosphonate ester | Salt product |
|---|---|---|---|
| 12 | Methyl amine (40%) | Diethyl carboethoxyphosphonate | Methylammonium monoethyl methylcarbamoylphosphonate. |
| 13 | do | Diisopropyl carbomethoxyphosphonate. | Methylammonium monoisopropyl methylcarbamoylphosphonate. |
| 14 | do | Diallyl carboethoxyphosphonate | Methylammonium monoallyl methylcarbamoylphosphonate. |
| 15 | Dimethylamine (25%) | Diethyl carbomethoxyphosphonate | Dimethylammonium monoethyl dimethylcarbamoylphosphonate. |
| 16 | Allylamine (30%) | Diallyl carbomethoxyphosphonate | Allylamomnium monoallyl allylcarbamoylphosphonate. |
| 17 | Butylamine (50%) | Dibutyl carbomethoxyphosphonate | Butylammonium monobutyl butylcarbamoylphosphonate. |
| 18 | Di-sec-butylamine (25%) (50-50 ethanol-water sol.). | Dimethyl carbomethoxyphosphonate | Di-sec-butylammonium monomethyl di-sec-butylcarbamoylphosphonate. |
| 19 | Diethylamine (25%) | Dimethylallyl carbopropoxyphosphonate. | Diethylammonium monomethylallyl diethylcarbamoylphosphonate. |
| 20 | Piperidine (50%) | Dibenzyl carbomethoxyphosphonate | Piperidinium monobenzylpiperidinocarbonylphosphonate. |

EXAMPLE 21

Eight parts of diethyl methylcarbamoylphosphonate is added slowly to 18 parts of a 29% aqueous solution of ammonia, while holding the temperature at 25° C. by external cooling. The unreacted ammonium hydroxide is allowed to evaporate, giving a white, crystalline, solid residue. Recrystallization from absolute ethanol gives 5 parts of ammonium monoethyl methylcarbamolylphosphonate, M.P. 189° C.

EXAMPLES 22–30

The procedure of Example 21 is repeated substituting an equivalent amount of the indicated "Aqueous Amine" for the ammonia of Example 21 and an equivalent amount of the indicated "Phosphonate Ester" for the diethyl methylcarbamoylphosphonate of Example 21 to obtain the indicated "Salt Product."

EXAMPLES 32–37

The procedure of Example 31 is repeated substituting an equivalent amount of the indicated "Aqueous Amine" for the ammonium hydroxide of Example 31 and an equivalent amount of the indicated "Phosphonate Ester" for the benzyl methyl carbomethoxyphosphonate of Example 31 to obtain the indicated "Salt Product" as the principal product of this procedure.

| Ex. | Aqueous amine | Phosphonate ester | Salt product |
|---|---|---|---|
| 32 | Methylamine (40%) | Benzyl methyl carbomethoxyphosphonate. | Methylammonium monobenzyl methylcarbamoylphosphonate. |
| 33 | Ammonia (29%) | Methyl phenyl carbomethoxyphosphonate. | Ammonium monophenyl carbamoylphosphonate. |
| 34 | Dimethylamine (25%) | Butyl ethyl carbomethoxyphosphonate. | Dimethylammonium monobutyl dimethylcarbamoylphosphonate. |
| 35 | Ethylamine (50%) | Methyl propargyl carbomethoxyphosphonate. | Ethylammonium monopropargyl ethylcarbamoylphosphonate. |
| 36 | Allylamine (25%) | Methyl allyl carboethoxyphosphonate. | Allylammonium monoallyl allylcarbamoylphosphonate. |
| 37 | Pyrrolidine (30%) | Methyl propyl carbomethoxyphosphonate. | Pyrrolidinium monopropyl pyrrolidinocarbonylphosphonate. |

EXAMPLE 38

To a stirring suspension of 25.4 parts ammonium monobutyl butylcarbamoylphosphonate and 100 parts methanol is added 42 parts of a 40% solution of N-benzyltrimethylammonium hydroxide in methanol. Ammonia and methanol are stripped from the mixture at 40° C. under reduced pressure, leaving benzyltrimethylammonium monobutyl butylcarbamoylphosphonate as a residue.

| Ex. | Aqueous amine | Phosphonate ester | Salt product |
|---|---|---|---|
| 22 | Ammonia (20%) | Diethyl butylcarbamoylphosphonate | Ammonium monoethyl butylcarbamoylphosphonate. |
| 23 | Ammonia (29%) | Diallyl allylcarbamoylphosphonate | Ammonium monoallyl allylcarbamoylphosphonate. |
| 24 | Methylamine (40%) | Dibutyl sec-butylcarbamoylphosphonate. | Methylammonium monobutyl sec-butylcarbamoylphosphonate. |
| 25 | Methylamine (25%) | Dimethyl diallyl carbamoylphosphonate. | Methylammonium monomethyl diallylcarbamoylphosphonate. |
| 26 | Dimethylamine (25%) | Diethyl carbamoylphosphonate | Dimethylammonium monoethyl carbamoylphosphonate. |
| 27 | Propylamine (20%) | Dimethylpropylcarbamoylphosphonate. | Propylammonium monomethyl propyl carbamoylphosphonate. |
| 28 | Allylamine (25%) | Diallyl carbamoylphosphonate | Allylammonium monoallyl carbamoylphosphonate. |
| 29 | Isobutylamine (20%) | Diisorpopyl methylcarbamoylphosphonate. | Isobutylammonium moniosopropyl methylcarbamoylphosphonate. |
| 30 | Methylamine (20%) | Diisorpopyl morpholinocarbonylphosphonate. | Methylammonium monoisopropyl morpholinocarbonylphosphonate. |

EXAMPLE 31

An aqueous solution of 45 parts ammonium hydroxide is stirred and chilled with an ice bath, while 24.4 parts benzyl methyl carbomethoxyphosphonate is added slowly. Stirring is continued until a clear solution is obtained. Un-

EXAMPLES 39–44

The procedure of Example 38 is repeated substituting an equivalent amount of the indicated "Base" for the N-benzyltrimethylammonium hydroxide of Example 38 and an equivalent amount of the indicated "Ammonium Phosphonate" for the ammonium monobutyl butylcarbamoylphosphonate of Example 38 to obtain the indicated "Salt Product."

Formulation

Plant growth modifying compositions of the present invention can be prepared by admixing at least one of the

| Ex. | Base | Ammonium phosphonate | Salt product |
|---|---|---|---|
| 39 | Tetraethylammonium hydroxide. | Ammonium monoallyl carbamoylphosphonate. | Tetramethylammonium monoallyl carbamoylphosphonate. |
| 40 | Trimethylamine (large excess). | Ammonium monoethyl methylcarbamolyphosphonate. | Trimethylammonium monoethyl methylcarbamoylphosphonate. |
| 41 | Tetramethylammonium hydroxide. | Ammonium monoisobutyl dibutylcarbamoylphosphonate. | Tetramethylammonium monoisobutyl dibutylcarbamoylphosphonate. |
| 42 | Dodecyltriethyl ammonium hydroxide. | Methyl ammonium monobutyl butylcarbamoylphosphonate. | Dodecyltriethylammonium monobutyl butylcarbamoylphosphonate. |
| 43 | 2-hydroxyethylamine | Ammonium monomethallyl hexahydroazepinocarbonylphosphonate. | 2-hydroxyethylammonium monomethallyl hexahydroazepinocarbonylphonate. |
| 44 | Benzylamine | Ethylammonium monopropyl ethyl carbamoylphosphonate. | Benzylammonium monopropyl ethylcarbamoyl phosphonate. |

EXAMPLE 45

A 5% aqueous solution of ammonium monopropyl methylcarbamoylphosphonate is passed through a packed column of sulfonated polystyrene copolymer hydrogen type resin to convert the salt to the free acid. This is neutralized immediately with the equivalent amount of sodium bicarbonate to give a solution of essentially pure sodium monopropyl methylcarbamoylphosphonate. Evaporation of this solution gives the solid salt product.

EXAMPLES 46–53

The procedure of Example 45 is repeated, first obtaining the free acids of the indicated "Ammonium Phosphonate" as was done in Example 45 and then neutralizing the acid with the indicated "Base" according to the procedure of Example 45 to obtain the indicated "Salt Product."

compounds of this invention with pest control adjuvants or modifiers to provide compositions in the form of dusts, water-soluble powders, solutions, granules or pellets. In addition, the plant growth modifying agents such as maleic hydrazide and "Alar" (N-dimethylaminosuccinamic acid) can be included in the compositions of this invention in combination with the compounds of this invention.

Compositions of the invention, may contain as a conditioning agent one or more surface-active agents, sometimes called surfactants. in amounts sufficient to render a given composition containing the compounds of this invention readily soluble in water or capable of wetting foliage efficiently.

The surface-active agent used in this invention can be a wetting, dispersing or an emulsifying agent which will assist dispersion and solution of the active compound. The surface-active agent or surfactant can include such

| Ex. | Ammonium phosphonate | Base | Salt product |
|---|---|---|---|
| 46 | Ammonium monophenyl carbamoylphosphonate. | Sodium bicarbonate | Sodium monophenyl carbamoylphosphonate. |
| 47 | Ammonium monobenzyl carbamoylphosphonate. | Calcium hydroxide | Hemicalcium monobenzyl carbamoylphosphonate. |
| 48 | Ethylammonium monoethyl ethylcarbamoylphosphonate. | Barium hydroxide | Hemibarium monoethyl ethylcarbamoylphosphonate. |
| 49 | Ammonium monoethyldimethylcarbamoylphosphonate. | Hydroxyethyltrimethylammonium hydroxide. | Hydroxyethyltrimethyl ammonium monomethyl dimethylcarbamoylphosphonate. |
| 50 | Ammonium monobenzylbutylcarbamoylphosphonate. | Benzyltrimethylammonium hydroxide. | Benzyltrimethylammonium monobenzylbutylcarbamoylphosphonate. |
| 51 | Ammonium monoallyl diallylcarbamoylphosphonate. | Magnesium hydroxide | Hemimagnesium monoallyl diallyl carbamoylphosphonate. |
| 52 | Methylammonium monobutylmethylcarbamoylphosphonate. | Morpholine | Morpholinium monobutyl methyl carbamoylphosphonate. |
| 53 | Ammonium monoisopropyl morpholinocarbonylphosphonate. | Trimethylamine | Trimethylammonium monoisopropyl morpholinocarbonylphosphonate. |

EXAMPLE 54

To a stirred solution of 10 parts of potassium bicarbonate and 50 parts of water is added 18.4 parts ammonium monoisobutyl carbamoylphosphonate. Stirring is continued until solution is complete. The solution is evaporated to dryness, giving the solid product, potassium monoisobutylcarbamoylphosphonate.

EXAMPLES 55–59

The procedure of Example 54 is repeated substituting the indicated "Bicarbonate Salt" for the potassium bicarbonate of Example 54 and an equivalent amount of the indicated "Carbamoylphosphonate" for the ammonium monoisobutyl carbamoylphosphonate of Example 54 to obtain the indicated "Salt Product."

anionic, cationic and non-ionic agents as have heretofore been generally employed in plant control compositions of similar type. Suitable surface-active agents are set forth, for example in "Detergents and Emulsifiers" 1967 Annual by John. W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions may have a greater effectiveness than can be expected from a consideration of the activity of the com-

| Ex. | Bicarbonate salt | Carbamoylphosphonate | Salt product |
|---|---|---|---|
| 55 | Sodium bicarbonate | Ammonium monoethylmethylcarbamoylphosphonate. | Sodium monoethylmethylcarbamoylphosphonate. |
| 56 | Potassium bicarbonate | Ammonium monobenzylcarbamoylphosphonate. | Potassium monobenzyl carbamoylphosphonate. |
| 57 | Lithium bicarbonate | Ammonium monomethyl butylcarbamoylphosphonate. | Lithium monomethyl butylcarbamoylphosphonate. |
| 58 | Tetramethylammonium bicarbonate | Methylammonium monoallyl piperidino carbonylphosphonate. | Tetramethylammonium monoallyl piperidino carbonylphosphonate. |
| 59 | Benzyltrimethylammonium bicarbonate. | Ammonium monobutylbutylcarbamoylphosphonate. | Benzyltrimethylammonium monobutyl butylcarbamoylphosphonate. | ponents used separately. When used at higher rates, it is preferred that the surfactant be present in the range of one-fifth to five parts surfactant for each part of active agent.

Water-soluble powders

Water-soluble powders are compositions containing the water-soluble active material, an inert solid extender which may or may not be water-soluble, and optionally one or more surfactants to provide rapid wetting and solution. A buffer, which may also function as an extender, can be present to improve formulation stability and to control the pH of the final spray solution.

The classes of extenders suitable for the water-soluble powder formulations of this invention are the natural clays, diatomaceous earth, synthetic mineral fillers derived from silica and silicate, starch, sugar, and inorganic salts. Most preferred fillers for this invention are kaolinites, attapulgite clay, montmorillonite clays, synthetic silicas, synthetic magnesium silicate, calcium sulfate dihydrate, and disodium hydrogen phosphate.

Suitable surfactants for use in such compositions are those listed by J. W. McCutcheon in "Detergents and Emulsifiers" 1967 Annual. Among the more preferred surfactants are the non-ionic and anionic type, and those most suitable for the preparation of the dry, soluble products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalene sulfonate, and sodium-N-methyl-N-(long chain acid) taurates.

Wetting and dispersing agents in these preferred water-soluble compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, water-soluble formulations of the invention will contain from about 25 to 95 weight percent active material, from 0.5 to 2.0 weight percent wetting agent, from 0.25 to 5.0 weight percent dispersant, and from 4.25 to 74.25 weight percent inert extender, as these terms are described above.

When the water-soluble powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

Solution concentrates

The aqueous solution concentrates are prepared by mixing a water-soluble active compound of this invention with water. A portion of the water may be replaced with methanol, ethanol, isopropanol, ethylene glycol, Cellosolve or methyl Cellosolve. Surfactants and buffering agents can optionally be present.

These aqueous solution concentrates will contain from 15 to 50% of active ingredient, and from 50 to 85% water or mixture of water and hydroxylated organic solvent. Surfactants, corrosion inhibitors, buffering and anti-foam agents may also be included in which case they may replace up to 10% of the solvent system.

Dusts

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, adsorptive grinding aid. For the dust compositions of this invention, the inert extender may be either of vegetable or mineral origin, the wetting agent is preferably anionic or nonionic and suitable adsorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid adsorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and ground calicum phosphate rock such as that known as "Phosphodust," a trademark of the American Agricultural Chemical Company.

Preferred grinding aids are attapulgite clay, diatomaceous silica, synthetic fine silica and synthetic calcium and magnesium silicates. Preferred wetting agents are those previously described under water-soluble powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The water-soluble powders described above can also be used in the preparation of dusts. While such water-soluble powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent adsorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the water-soluble powders used to make the dusts.

Granules and pellets

Under some circumstances it may be advantageous to apply the compounds of this invention in the form of granules or pellets. Suitable carriers are natural clays, some pyrophyllites and vermiculites. Wetting agents of the type listed by J. W. McCutcheon in "Detergents and Emulsifiers" 1967 Annual can also be present to aid leaching of the active component.

One method of preparation suitable for both granules and pellets involves blending the active ingredient with clays, water-soluble salts, surfactants and a small amount of water. After pelleting and/or granulating, the formulation is dried prior to use. A second method suitable for the preparation of granules formulation involves spraying a solution of the active material on porous, adsorptive, preformed clay or vermiculite granules. Surfactants listed by McCutcheon can also be included in the spray solution. After drying, the granules are ready for application.

The preferred granules or pellets will contain about 5 to 30 weight percent of active material, about 0 to 5 weight percent wetting agent and about 65 to 95 weight percent inert mineral carrier.

Application

As stated earlier, this invention is founded on the discovery that the compounds of Formula 1 are useful for modifying the growth rate of plants. More particularly the compounds of this invention are useful as plant growth retardants.

The term plant growth retardant as used in this disclosure is to be understood to mean an agent which when applied to a plant or its environs will slow the growth of the plant without killing or causing extensive injury to said plant.

The compounds of this invention can be used to retard the growth of woody vegetation. The compounds of this invention can also be used to control the growth of turf and other herbaceous vegetations.

The compounds of this invention can be applied as foliar sprays or as soil applications to retard the growth rate of such plants.

Preferably, the compounds of this invention are applied as a foliar spray to the point of runoff although lower volume application may also be effective.

It is preferred that the application be made a short time prior to the period when maximum plant growth is anticipated, but application can also be made just after the plants have been trimmed.

It will be recognized that the rate of application is dependent upon the species to be treated and the results desired. In general, rates of from ½ to 20 kilograms per hectare are used although higher or lower rates can achieve the desired effect in some instances.

The following examples are presented to further illustrate the formulation and application of the compounds of this invention. Parts and percentages in the following examples are by weight unless otherwise indicated.

EXAMPLE 60

A dust having the following formula is prepared.

| | Percent |
|---|---|
| Ammonium monoallylcarbamoylphosphonate | 5.0 |
| Talc | 64.0 |
| Attapulgite | 30.0 |
| Sodium benzenesulfonate | 1.0 |

The active component is ground with the minor diluent and the surfactant to pass a 0.149 mm. screen. This material is then blended with the major diluent to form a dust composition.

It will be understood that the other compounds of this invention can also be formulated in a like manner.

The dust formulation of Example 60 is applied, using a helicopter, at a rate of 100 kilograms per hectare to an area under an electric power line in which the brush and trees have been freshly trimmed in spring at the time when the leaves on most of the plants are just fully expanded. The application is made in the early morning when the foliage is wet with dew or just after a rain. This treatment retards the growth of a large number of species along the right-of-way including the following species: red maple (*Acer rubrum*), black willow (*Salix nigra*), hawthorn (Crataegus spp.), sweet gum (*Liquidamber styraciflua*) and yellow poplar (*Liriodendron tulipifera*).

EXAMPLE 61

A water soluble powder of the following formula is prepared.

| | Percent |
|---|---|
| Ammonium monoallyl carbamoylphosphonate | 95.0 |
| Synthetic silica | 3.5 |
| Disodium hydrogen phosphate | 1.0 |
| Dioctylsodium sulfosuccinate | 0.5 |

The above ingredients are mixed and then ground to pass a 0.42 mm. screen. The resulting formulation is water-soluble powder, with the exception of the synthetic silica conditioning agent.

The following compounds of this invention can also be formulated in like manner.

Ammonium monomethyl carbamoylphosphonate
Sodium monophenyl carbamoylphosphonate
Hemicalcium monobenzyl carbamoylphosphonate
Hemibarium monoethyl carbamoylphosphonate
Diethylammonium monoethyl carbamoylphosphonate Four kilograms of the water-soluble powder formulation of Example 61 is dissolved in 200 liters of water and 0.5 of a non-phytotoxic wetting agent is added. This solution is sprayed on one hectare of freshly trimmed Norway maple (*Acer plantanoides*) growing along struts under a power line. This treatment greatly reduces the rate of growth of the trees and extends the time interval between trimmings. The trees are not significantly injured by the treatment.

EXAMPLE 62

A wettable powder of the following formula is prepared.

| | Percent |
|---|---|
| Hemibarium monobenzyl dibutylcarbamoyl phosphonate | 50.0 |
| Montmorrilonite | 43.0 |
| Synthetic silica | 4.0 |
| Disodium hydrogen phosphate | 1.0 |
| Sodium alkylnaphthalene sulfonate | 1.0 |
| Sodium lignin sulfonate | 1.0 |

The above ingredients are mixed and then ground to pass a 0.25 mm. screen. The active ingredient in the above formulation dissolves when the composition is added to water.

Twenty kilograms of the formulation of Example 62 is added to 400 liters of water and agitated until the active ingredient dissolves. This solution is then sprayed on one hectare of newly trimmed hedgerow in the spring after the leaves have expanded. This treatment greatly reduces the growth of plants growing in the the hedgerow as osage orange (*Maclura pomifera*), but does not seriously injure them. The hedgerow is thus kept neat with a minimum of labor expended for trimming it.

EXAMPLE 63

A solution of the following formula is prepared.

| | Percent |
|---|---|
| Ammonium monoethyl carbamoylphosphonate | 24.0 |
| Disodium hydrogen phosphate | 1.0 |
| Sodium laurylsulfate | 0.5 |
| Water | 74.5 |

The above components are blended to form a homogeneous solution.

The following compounds can be formulated in like manner.

Benzyltrimethylammonium monobenzyl butylcarbamoylphosphonate
Trimethylammonium monoethyl methylcarbamoylphosphonate
Methylammonium monoisopropyl morpholinocarbonylphosphonate Ten kilograms of the solution prepared in Example 63 are added to 200 liters of water and applied with a fixed boom sprayer to one hectare of Kentucky bluegrass (*Poa pratensis*) growing along a highway in early June. This treatment greatly reduces the rate of growth of the bluegrass for a period of four to eight weeks and the moving required to maintain the area in an attractive condition is reduced.

EXAMPLE 64

A solution of the following formula is prepared.

|   | Percent |
|---|---|
| Allylammonium monoallyl diallylcarbamoylphosonate | 24.0 |
| Trimethylnonylpolyethyleneglycol ether | 1.0 |
| Water | 20.0 |
| Ethylene glycol | 55.0 |

The above components are blended to form a homogeneous solution.

The following components can be formulated in like manner.

2-hydroxyethylammonium monomethylallyl hexahydroazepinocarbonylphosphonate

Dodecyltrimethylammonium monobutyl butylcarbamoylphosphonate

Six kilograms of the formulation of Example 64 are added to 400 liters of water containing 0.5% Tween 20 (polyoxyethylenesorbitan monolaurate). This solution is sprayed to runoff on a freshly trimmed privet (*Ligustrum ovalifolium*) in May. The treatment greatly reduces the growth of the hedge. Little labor is required to keep it attractive all season.

EXAMPLE 65

The following formulation is prepared.

|   | Percent |
|---|---|
| Ammonium monomethyl carbamoylphosphonate | 25.0 |
| Sodium lauryl sulfate | 50.0 |
| Magnesium silicate | 10.0 |
| Kaolinite | 15.0 |

The above components are blended, micropulverized to pass a 0.30 mm. screen and reblended.

The following compounds can be formulated in like manner.

Sodium monophenyl carbamoylphosphonate
Hemicalcium monobenzyl carbamoylphosphonate Five kilograms of the formulation of Example 65 are suspended in 100 liters of water and then sprayed to runoff on freshly trimmed trees and brush along the edge of a power line right-of-way. This treatment greatly reduces the growth of the trees and shrubs without permanent injury to them and they are prevented from growing over into the power line. The vegetation on the right-of-way is controlled by applying herbicides. This treatment reduces the labor required to maintain the line.

I claim:

1. A method for retarding the growth rate of plants which comprises applying an effective amount of a compound of the formula:

$$R_1-O-\overset{O}{\underset{O-M^+}{\overset{\uparrow}{P}}}-\overset{O}{\overset{\|}{C}}-N\overset{R_2}{\underset{R_3}{}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are —$(CH_2)_2$—O—$(CH_2)_2$— or —$(CH_2)_n$— where $n$ is 4, 5 or 6; and M is hydrogen, sodium, lithium, potassium, calcium, magnesium, barium or $$\overset{R_4}{\underset{R_5}{}}\overset{}{\underset{}{N}}\overset{R_6}{\underset{R_7}{}}$$

where $R_4$, $R_5$ and $R_6$ can be the same or different and each can be hydrogen, alkyl of one through four carbons; and $R_7$ is hydrogen, alkyl of one through twelve carbons or benzyl;

to said plant to effect growth retardation.

2. A method for retarding the growth rate of plants which comprises applying an effective amount of a compound of the formula:

$$R_1-O-\overset{O}{\underset{O-M^+}{\overset{\uparrow}{P}}}-\overset{O}{\overset{\|}{C}}-N\overset{R_2}{\underset{R_3}{}}$$

where $R_1$ is alkyl of one through four carbons, or alkenyl of three through four carbons;

$R_2$ and $R_3$ are each hydrogen; and

M is hydrogen, sodium, lithium, or potassium;

to said plant to effect growth retardation.

3. A method for retarding the growth rate of plants which comprises applying an effective amount of ammonium allyl carbamoylphosphonate to said plant to effect growth retardation.

4. A method for retarding the growth rate of plants which comprises applying an effective amount of a compound of the formula:

$$R_1-O-\overset{O}{\underset{O-M^+}{\overset{\uparrow}{P}}}-\overset{O}{\overset{\|}{C}}-N\overset{R_2}{\underset{R_3}{}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are —$(CH_2)_2$—O—$(CH_2)_2$— or —$(CH_2)_n$— where $n$ is 4, 5, or 6; and M is hydrogen, sodium, lithium, potassium, calcium, magnesium, barium or $$\overset{R_4}{\underset{R_5}{}}\overset{}{\underset{}{N}}\overset{R_6}{\underset{R_7}{}}$$

where $R_4$, $R_5$ and $R_6$ can be the same or different and each can be hydrogen, alkyl of one through four carbons; and $R_7$ is hydrogen, alkyl of one through twelve carbons or benzyl;

to the locus of said plants.

5. A method for retarding the growth rate of plants which comprises applying an effective amount of a compound of the formula:

$$R_1-O-\overset{O}{\underset{O-M^+}{\overset{\uparrow}{P}}}-\overset{O}{\overset{\|}{C}}-N\overset{R_2}{\underset{R_3}{}}$$

where $R_1$ is alkyl of one through four carbons, or alkenyl of three through four carbons, $R_2$ and $R_3$ are each hydrogen; and M is hydrogen, sodium, lithium, or potassium;

to the locus of said plants.

6. A method for retarding the growth rate of plants which comprises applying an effective amount of ammonium allyl carbamoylphosphonate to the locus of said plants.

7. A method for retarding the growth rate of woody vegetation which comprises applying an effective amount of a compound of the formula:

$$R_1-O-\overset{\overset{O}{\uparrow}}{\underset{O^-N^+}{P}}-\overset{\overset{O}{\|}}{C}-N\overset{R_2}{\underset{R_3}{}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $-(CH_2)_2-O-(CH_2)_2-$ or $-(CH_2)_n-$ where $n$ is 4, 5 or 6; and M is hydrogen, sodium, lithium, potassium, calcium, magnesium, barium or $$\overset{R_4}{\underset{R_5}{}}\overset{}{\underset{}{N}}\overset{R_6}{\underset{R_7}{}}$$

where:

$R_4$, $R_5$ and $R_6$ can be the same or different and each can be hydrogen, alkyl of one through four carbons; and $R_7$ is hydrogen, alkyl of one through twelve carbons or benzyl;

to said vegetation.

8. A method for retarding the growth rate of woody vegetation which comprises applying an effective amount of a compound of the formula:

$$R_1-O-\overset{\overset{O}{\uparrow}}{\underset{O^-M^+}{P}}-\overset{\overset{O}{\|}}{C}-N\overset{R_2}{\underset{R_3}{}}$$

where $R_1$ is alkyl of one through four carbons, or alkenyl of three through four carbons, $R_2$ and $R_3$ are each hydrogen; and M is hydrogen sodium, lithium, or potassium;

to said vegetation.

9. The method of claim 7 which comprises applying an effective amount of ammonium allyl carbamoylphosphonate.

10. The method of claim 7 which comprises applying an effective amount of ammonium ethyl carbamoylphosphonate.

11. The method of claim 4 which comprises applying an effective amount of ammonium ethyl carbamolyphosphonate.

12. A method for retaring the growth rate of woody vegetation which comprises applying an effective amount of a compound of the formula:

$$R_1-O-\overset{\overset{O}{\uparrow}}{\underset{O^-M^+}{P}}-\overset{\overset{O}{\|}}{C}-N\overset{R_2}{\underset{R_3}{}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $-(CH_2)_2-O-(CH_2)_2-$ or $-(CH_2)_n-$ where $n$ is 4, 5 or 6; and M is hydrogen, sodium, lithium, potassium, calcium, magnesium, barium or $$\overset{R_4}{\underset{R_5}{}}\overset{}{\underset{}{N}}\overset{R_6}{\underset{R_7}{}}$$

where $R_4$, $R_5$ and $R_6$ can be the same or different and each can be hydrogen, alkyl of one through four carbons; and $R_7$ is hydrogen, alkyl of one through twelve carbons or benzyl;

to the locus of said vegetation.

13. A method for retarding the growth rate of woody vegetation which comprises applying an effective amount of a compound of the formula:

$$R_1-O-\overset{\overset{O}{\uparrow}}{\underset{O^-M^+}{P}}-\overset{\overset{O}{\|}}{C}-N\overset{R_2}{\underset{R_3}{}}$$

where $R_1$ is alkyl of one through four carbons, or alkenyl of three through four carbons, $R_2$ and $R_3$ are each hydrogen; and M is hydrogen, sodium, lithium, or potassium;

to the locus of said vegetation.

14. The method of claim 6 which comprises applying an effective amount of ammonium ethyl carbamoylphosphonate.

15. A plant growth regulant composition comprising an effective amount of a compound of the formula:

$$R_1-O-\overset{\overset{O}{\uparrow}}{\underset{O^-M^+}{P}}-\overset{\overset{O}{\|}}{C}-N\overset{R_2}{\underset{R_3}{}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $-(CH_2)_2-O-(CH_2)_2-$ or $-(CH_2)_n-$ where $n$ is 4, 5 or 6; and M is hydrogen, sodium, lithium, potassium, calcium, magnesium, barium or $$\overset{R_4}{\underset{R_5}{}}\overset{}{\underset{}{N}}\overset{R_6}{\underset{R_7}{}}$$

where $R_4$, $R_5$ and $R_6$ can be the same or different and each can be hydrogen, alkyl of one through four carbons; and $R_7$ is hydrogen, alkyl of one through twelve carbons or benzyl;

in combination with suitable agricultural adjuvants and modifiers.

16. A plant growth regulant composition comprising from 5 to 95 weight percent of a compound of the formula:

$$R_1-O-\overset{O}{\underset{\underset{O-M^+}{|}}{\overset{\uparrow}{P}}}-\overset{O}{\overset{\|}{C}}-N\overset{R_2}{\underset{R_3}{\diagdown}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $$-(CH_2)_2-O-(CH_2)_2-$$

or $-(CH_2)_n-$ where $n$ is 4, 5 or 6; and

M is hydrogen, sodium, lithium, potassium, calcium, magnesium, barium or $$\overset{R_4}{\underset{R_5}{\diagdown}}\overset{}{\underset{}{N}}\overset{R_6}{\underset{R_7}{\diagup}}$$

where $R_4$, $R_5$ and $R_6$ can be the same or different and each can be hydrogen, alkyl of one through four carbons; and $R_7$ is hydrogen, alkyl of one through twelve carbons or benzyl;

in combination with 5 to 75 weight percent suitable agricultural adjuvants and modifiers.

17. A plant growth regulant composition comprising from 5 to 95 weight percent of a compound of the formula:

$$R_1-O-\overset{O}{\underset{\underset{O-M^+}{|}}{\overset{\uparrow}{P}}}-\overset{O}{\overset{\|}{C}}-N\overset{R_2}{\underset{R_3}{\diagdown}}$$

where $R_1$ is alkyl of one through four carbons, alkenyl of three through four carbons, alkynyl of three through four carbons, phenyl or benzyl;

$R_2$ and $R_3$ can be the same or different and each can be hydrogen, alkyl of one through four carbons, alkenyl of three through four carbons, alkynyl of three through four carbons or $R_2$ and $R_3$ can be taken together to form a ring wherein $R_2$ and $R_3$ taken together are $$-(CH_2)_2-O-(CH_2)_2-$$

or $-(CH_2)_n-$ where $n$ is 4, 5 or 6; and

M is hydrogen, sodium, lithium, potassium, calcium, magnesium, barium or $$\overset{R_4}{\underset{R_5}{\diagdown}}\overset{}{\underset{}{N}}\overset{R_6}{\underset{R_7}{\diagup}}$$

where $R_4$, $R_5$ and $R_6$ can be the same or different and each can be hydrogen, alkyl of one through four carbons; and $R_7$ is hydrogen, alkyl of one through twelve carbons or benzyl, from 0.5 to 2.0 weight percent wetting agent, from 0.25 to 5.0 weight percent dispersant and from 4.25 to 94.25 weight percent inert extender.

18. A plant growth regulant composition comprising an effective amount of a compound of the formula:

$$R_1-O-\overset{O}{\underset{\underset{O-M^+}{|}}{\overset{\uparrow}{P}}}-\overset{O}{\overset{\|}{C}}-N\overset{R_2}{\underset{R_3}{\diagdown}}$$

where $R_1$ is alkyl of one through four carbons, or alkenyl of three through four carbons, $R_2$ and $R_3$ are each hydrogen; and M is hydrogen, sodium, lithium, or potassium;

in combination with suitable agricultural adjuvants and modifiers.

19. A plant growth regulant composition comprising from 5 to 95 weight percent of a compound of the formula;

$$R_1-O-\overset{O}{\underset{\underset{O-M^+}{|}}{\overset{\uparrow}{P}}}-\overset{O}{\overset{\|}{C}}-N\overset{R_2}{\underset{R_3}{\diagdown}}$$

where $R_1$ is alkyl of one through four carbons, or alkenyl of three through four carbons, $R_2$ and $R_3$ are each hydrogen; and M is hydrogen, sodium, lithium, or potassium, in combination with 5 to 95 weight percent suitable agricultural adjuvants and modifiers.

20. A plant growth regulant composition comprising from 5 to 95 weight percent of a compound of the formula:

$$R_1-O-\overset{O}{\underset{\underset{O-M^+}{|}}{\overset{\uparrow}{P}}}-\overset{O}{\overset{\|}{C}}-N\overset{R_2}{\underset{R_3}{\diagdown}}$$

where $R_1$ is alkyl of one through four carbons, or alkenyl of three through four carbons, $R_1$ and $R_3$ are each hydrogen; and M is hydrogen, sodium, lithium, or potassium, from 0.5 to 2.0 weight percent wetting agent, from 0.25 to 5.0 weight percent dispersant and from 4.25 to 94.25 weight percent inert extender.

21. A plant growth regulant composition comprising an effective amount of ammonium allyl carbamoylphosphonate in combination with suitable agricultural adjuvants and modifiers.

22. A plant growth regulant composition comprising from 5 to 95 weight percent of ammonium allyl carbamoylphosphonate in combination with 5 to 95 weight percent suitable agricultural adjuvants and modifiers.

23. A plant growth regulant composition comprising from 5 to 95 weight percent of ammonium ethyl carbamoylphosphonate, from 0.5 to 2.0 weight percent wetting agent, from 0.25 to 5.0 weight percent dispersant and from 4.25 to 94.25 weight percent inert extender.

References Cited

UNITED STATES PATENTS 3,156,554  11/1964  Tolbert _____ 71—86 X
3,005,010  10/1961  Grisley _____ 71—86 X LEWIS GOTTS, Primary Examiner C. L. MILLS, Assistant Examiner U.S. Cl. X.R.

71—86; 260—239 B, 247.7 D, 294.7 A, 326.5 A, 924